(12) United States Patent
Hodges et al.

(10) Patent No.: US 11,610,403 B2
(45) Date of Patent: Mar. 21, 2023

(54) GRAPHICAL MANAGEMENT SYSTEM FOR INTERACTIVE ENVIRONMENT MONITORING

(71) Applicant: Security Systems, L.L.C., Greenville, IL (US)

(72) Inventors: W. Lance Hodges, Stillwell, KS (US); S. Robert Johnson, Greenville, IL (US)

(73) Assignee: Security Systems, L.L.C., Greenville, IL (US)

( * ) Notice: Subject to any disclaimer, the term of this patent is extended or adjusted under 35 U.S.C. 154(b) by 10 days.

(21) Appl. No.: 17/354,547

(22) Filed: Jun. 22, 2021

(65) Prior Publication Data

US 2021/0319235 A1 Oct. 14, 2021

Related U.S. Application Data

(63) Continuation of application No. 16/838,241, filed on Apr. 2, 2020, now Pat. No. 11,074,460.

(51) Int. Cl.
| | |
|---|---|
| *G06V 20/52* | (2022.01) |
| *B64C 39/02* | (2023.01) |
| *G05D 1/00* | (2006.01) |
| *G06F 3/04815* | (2022.01) |
| *G06F 3/0485* | (2022.01) |
| *G08G 5/00* | (2006.01) |
| *G05D 1/12* | (2006.01) |
| *B64U 101/30* | (2023.01) |

(52) U.S. Cl.
CPC ............ *G06V 20/52* (2022.01); *B64C 39/024* (2013.01); *G05D 1/0016* (2013.01); *G05D 1/0094* (2013.01); *G05D 1/12* (2013.01); *G06F 3/0485* (2013.01); *G06F 3/04815* (2013.01); *G08G 5/0069* (2013.01); *G08G 5/0073* (2013.01); *B64U 2101/30* (2023.01); *G06F 2203/04806* (2013.01); *G06F 2211/004* (2013.01)

(58) Field of Classification Search
None
See application file for complete search history.

(56) References Cited

U.S. PATENT DOCUMENTS

| | | | |
|---|---|---|---|
| 2012/0314018 A1* | 12/2012 | Wengrovitz | H04N 7/181 348/E7.083 |
| 2014/0047381 A1* | 2/2014 | Fan | G06F 3/0482 715/800 |
| 2018/0275752 A1* | 9/2018 | Peterson | G06F 3/013 |
| 2020/0201521 A1* | 6/2020 | Faulkner | G06F 3/0485 |

* cited by examiner

*Primary Examiner* — Talha M Nawaz
(74) *Attorney, Agent, or Firm* — Erise IP, P.A.

(57) ABSTRACT

Systems and methods for monitoring an environment using a Graphical Management System (GMS) are described. The GMS may present a vector image map of the environment for interaction by a user. The user may zoom and pan on the map to generate views of the map with various ranges of detail of the map. Video data from a plurality of video cameras may also be displayed on the map based on the user input and the level of zoom and the location viewed in the map. Further, the user may select a timeline event and sensor data associated with the event and the map may be initialized at the time and location of the event.

20 Claims, 6 Drawing Sheets

GRAPHICAL MANAGEMENT SYSTEM FOR INTERACTIVE ENVIRONMENT MONITORING

RELATED APPLICATIONS

This patent application is a continuation application claiming priority benefit, with regard to all common subject matter, of U.S. patent application Ser. No. 16/838,241, filed Apr. 2, 2020, and entitled "GRAPHICAL MANAGEMENT SYSTEM FOR INTERACTIVE ENVIRONMENT MONITORING." The above-referenced application is hereby incorporated by reference in its entirety into the present application.

BACKGROUND

1. Field

Embodiments of the invention generally relate to monitoring an environment. Specifically, embodiments of the invention are directed to providing an interactive interface to a user for monitoring of the environment.

2. Related Art

Traditionally, video management systems provide lists of numbers and names of locations and cameras and other sensors along with bitmap images that are not interactive. Typically, when an event occurs in a monitored environment such as, for example, a prison, the monitoring system records the event and the security team has to go back and search for the event through the recorded history and find the event to view it. This is time consuming and inefficient. Further, if an event is taking place in real time, it is difficult to find the location of the event, find a camera that is in position to view the event and switch to view that camera. If the event moves to a different location the search for a new camera in position to capture the new location starts all over again. This provides systems that are difficult to understand and slow for a user to navigate. These systems are extremely inefficient and difficult to operate.

What is needed is a different type of management system that provides the user an interactive efficient method of monitoring different locations and times quickly. Embodiments of a graphical management system described herein include a vector based mapping system that allows the user to interact with the map to zoom, pan, and display different videos simply by interacting with the map. The map may generate different information based on the location viewed and the zoom level viewed providing the user with an environment that is easy to navigate through both space and time.

SUMMARY

Embodiments of the invention address the above-described need by providing for novel techniques of providing an interactive graphical management system that provides a user the ability to seamlessly move around an environment in space and time with an interactive vector graphics mapping system.

In particular, a first embodiment is directed to a method of monitoring an environment with a graphical management system, the method comprising the steps of presenting, via a graphical user interface, a map of an environment, obtaining video data of the environment from a video camera, generating a video camera indicium associated with the video camera in the map of the environment, and generating a video display displaying the video data in the graphical user interface over the map of the environment, wherein the video display is displayed based at least in part on a zoom level of the map.

A second embodiment is directed to a method of monitoring an environment with a graphical management system, the method comprising obtaining video data of an environment by a plurality of video cameras, displaying a map of the environment by a graphical user interface, wherein the map of the environment is a vector graphics image, displaying video camera indicia at locations of the plurality of video cameras, and displaying the video data of at least one of the plurality of video cameras on a video display.

A third embodiment is directed to a system for monitoring an environment comprising a video camera capturing video data of an environment, a processor, one or more non-transitory computer-readable media storing computer-executable instructions that, when executed by the processor, perform a method of presenting a graphical user interface of a map of the environment including the video data, comprising the steps of obtaining the video data of the environment from the video camera, and generating a video display displaying the video data over the map, wherein the video display is displayed based at least in part on a zoom level of the map.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTIONS OF THE DRAWING FEATURES

Embodiments of the invention are described in detail below with reference to the attached drawing figures, wherein.

Figure 1:
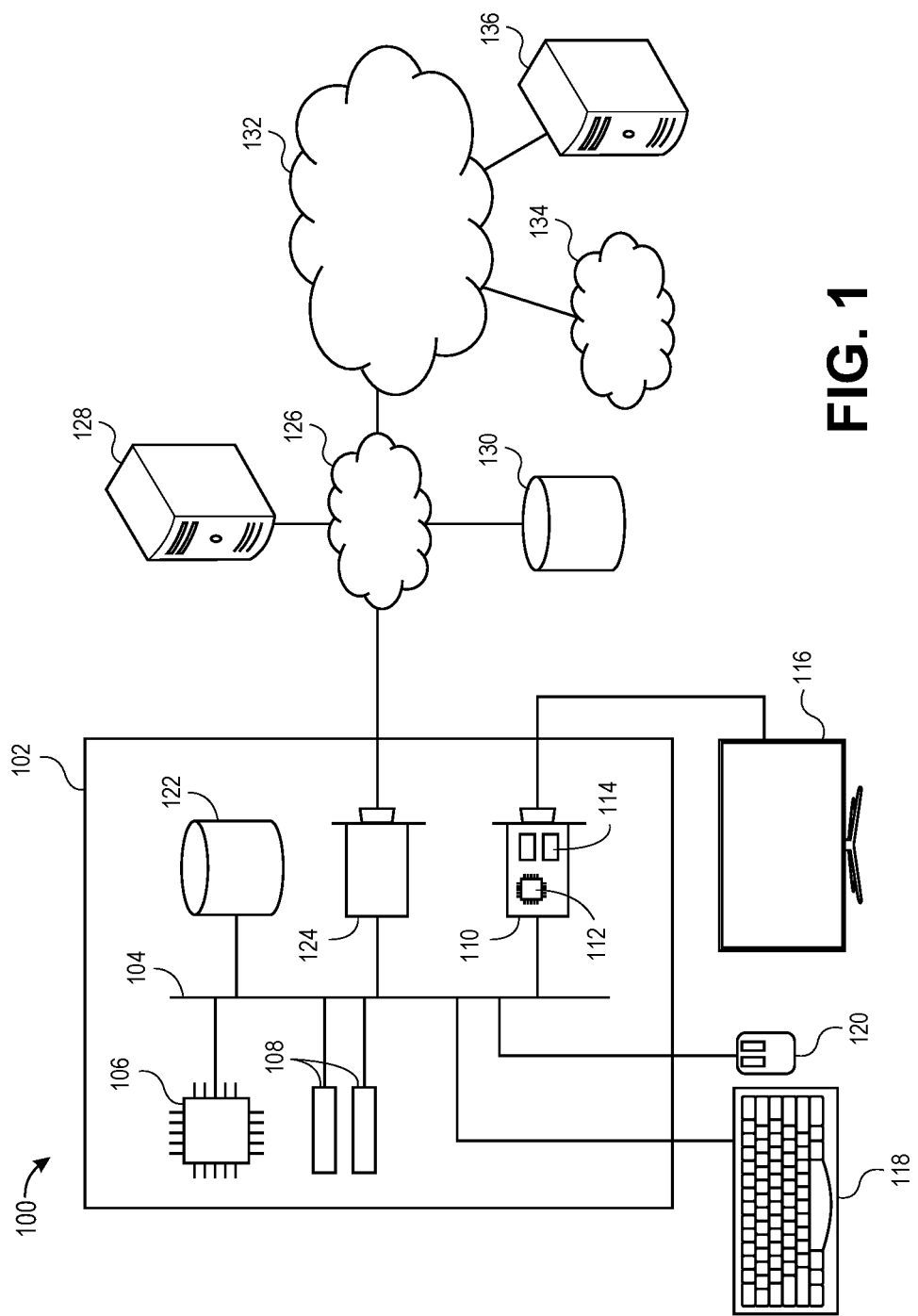
FIG. 1 depicts an exemplary hardware platform for certain embodiments of the invention.

The drawings do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide a Graphical Management System (GMS) for efficient user interaction to reduce time of use and complexity over other typical systems. It should be understood that the GMS is not limited to video monitoring and comprises motion sensors, magnetic sensors, proximity sensors, thermometers, and any other sensors described herein or contemplated to aid in monitoring activity in any environment. In some embodiments, the GMS provides a vector graphics image of a monitored environment. The environment may be a bank, prison, school, business, shopping mall, sports arena, city park, or any other environment that can be monitored for activity. The GMS may provide an interactive map allowing the user to zoom and pan the map to view various locations within the environment. When the user zooms and pans the map, a new image may be generated with new details in the image. In some embodiments, various new details are generated based on the zoom level and the pan. For example, video may be displayed automatically based on the location viewed and the zoom level of the map. Further, the GMS may provide a timeline of tracked events such that the user may select an event and view the environment at the time of the event.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Turning first to FIG. 1, an exemplary hardware platform 100 for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, in some embodiments, network interface card (NIC) 124 is also optionally attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

In some embodiments, computer 102 presents a Graphical Management System (GMS) comprising computer-executable instructions that, when executed by a processor, perform methods described herein. In some embodiments, the GMS comprises sensors such as, for example, cameras, motion sensors, biometric sensors, proximity sensors, microphones, smoke/heat sensors, magnetic sensors, and any other sensor that may be used to monitor any activity in an environment. In some embodiments, biometric sensors comprise sensors for detecting fingerprint, iris, face, voice, and any other biometric information. In some embodiments, the GMS comprises at least one non-transitory computer readable media storing computer-executable instructions that, when executed by a processor, detect, recognize, and analyze the sensor data.

Figure 2:
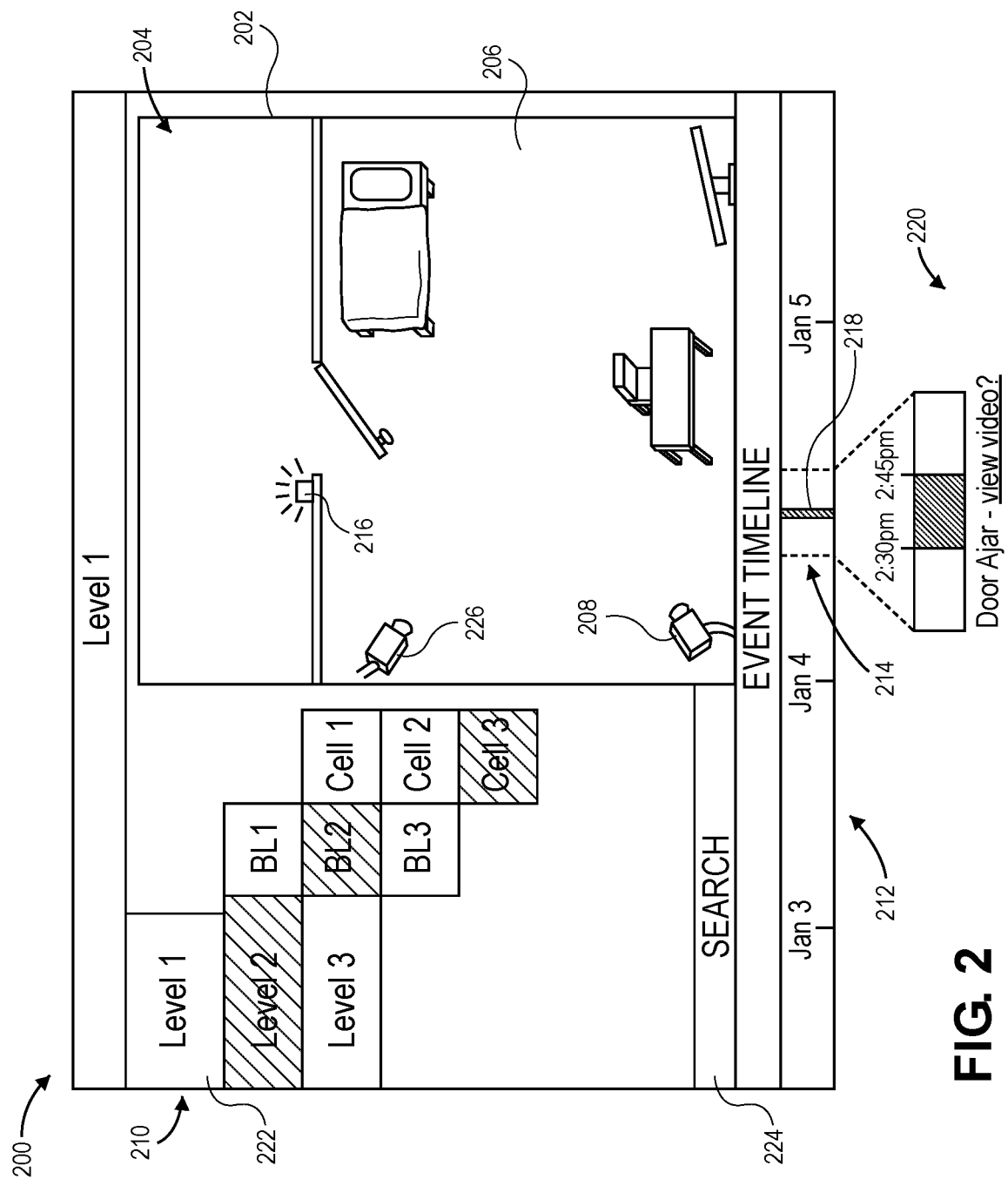
FIG. 2 depicts an embodiment of a user interface for monitoring an environment and interacting with a graphical management system.

FIG. 2 depicts a Graphical User Interface (GUI) 200 that presents interactive features of the GMS. In some embodiments, the GUI 200 generates a window 202 presenting the monitored GMS environment 204 as a map 206 as a vector image. The vector image provides advantages not typical in the art. Typically, a bitmap image is used for monitoring systems. Utilizing the vector image map 206 of the environment 204 allows the user to interact directly with the map 206. For example, the user may zoom in on the map 206 and the GMS may generate features in the map 206 of the environment 204 that were previously not displayed. For example, more detail from the environment 204 may be displayed such as tables, chairs, sensors. In some embodiments, information from the sensors may be displayed such as, for example, video, metadata, temperature, time, still photographs, status, and any other information from a sensor described herein. Further, the user may pan to different rooms and the rooms may be generated in the map 206. In some embodiments, the user may select a camera indicium 208 and the video from the associated camera may be displayed on the map 206. In some embodiments, the video from the associated camera may be displayed in a panel 210. Further, the video may be displayed or not displayed based on the zoom level as described in embodiments below. As the user pans, the video may remain playing over the map 206 in a video display. Any windows of the GUI 200 may be docked in different arrangements and may be customizable by the user. These features are discussed in more detail below.

In some embodiments, the GUI 200 presents panels and windows that may be rearranged and customizable by the user. For example, any of the panels and windows may be dragged to different portions of the screen and dropped, replacing and rearranging the panels and windows. The panels and windows may also be resized by clicking on the edges and corners and dragging to change the size and shape. Panels and windows may also be undocked from the page and made into a page in itself that may be manipulated similarly. In some embodiments, the panels and windows may be displayed and edited on a plurality of displays by a plurality of users. In some embodiments, the panels and windows may be displayed automatically by triggering events on a plurality of monitors as described in embodiments below.

For example, a panel 210 may provide an exemplary drop-down menu for selecting the view in the window. The panel 210 can add different floor views on different panels such that the user may view different floor maps simultaneously. In some embodiments, the user may zoom in on a first floor depicted in a first panel while viewing a second floor in a second panel from a different zoom level. Video may be viewed from the first floor in the first panel on a video display. The video display may be undocked from the first window, and page, and may be moved to any portion of the screen. The video display is discussed in greater detail below.

Similarly, the first floor may be viewed in a plurality of panels such that each panel may show the first floor in different zoom levels and pan locations. For example, the entire first floor may be viewed on a display in a panel while a zoomed portion of the first floor may be viewed in a different panel on the same display.

In some embodiments, the panel 210 may comprise a drop-down menu 222. The drop-down menu 222 may display any location, zoom level, and sensor accessible by the GMS. The user may simply click on the drop-down menu 222 to access any location, sensor, and zoom level for display. In alternative embodiments, the panel 210 may be any other selection type menu. The panel 210 may also provide a search field 224. The search field 224 may utilize natural language detection and provide guesses at the users search input.

In some embodiments, a timeline 212 is presented to the user on the GUI 200 by the GMS. The timeline 212 may present a timeline of events. The timeline 212 may also present any information associated with the events such as location, sensor information, people involved, staff on duty, and any other information associated with an event. The information associated with an event may be displayed on the timeline 212 or may be displayed when the event is selected from the timeline 212. The timeline 212 may be customized to display any stored history. The timeline 212 may be moved to any portion of the GMS GUI 200 screen and may be undocked and viewed as a separate window.

In some embodiments, the timeline 212 may display the events with an event indicator 214 that an event has occurred. For example, a sensor 216 may detect that a door is left open for an amount of time during an unauthorized time. The event may be marked with a highlighted area 218 of color to indicate that the event has taken place. The user may select an event or a region of the timeline 212 such as, for example, the highlighted area 218. Upon selection, metadata associated with the event such as time, location, people in the area, staff on duty, or any other information that may be associated with the event may be displayed. Further, upon selection of the event or region, video of the event from cameras in an area in close proximity to the event such as camera 208 may be displayed. In certain embodiments, an option 220 to view the video may be displayed.

In some embodiments, the color of the event indicator 214 may indicate the event or may indicate the severity and urgency of review of the event. For example, a red color may indicate a fire while green is indicative of a theft. Similarly, a red color may indicate high urgency while green indicates a lower urgency. Urgent warnings may be indicative of events such as, fire alarm, altercation, security breach, or other such events while green is indicative of an event that needs less immediate attention. Further, moderate events may be indicated with a yellow color. Any color or shading may be used to indicate severity or urgency of various events. Further, the color may indicate the event itself such as, for example, fire, theft, firearm, and any other event.

In some embodiments, the event indicator 214 may indicate the threat level of an event. For example, a threat range may be applied to events from 1 to 5; 1 being low threat, 5 being high threat. For example, a person with pizza is at the main entrance to a school. This may be recognized a low threat and a staff and on site security are notified to assist the person. Alternatively, a person with a firearm is attempting to breach a locked entrance. This event may be recognized as a level 5 threat and the school goes into lockdown mode and the police are notified. In some embodiments, the sensor data is sent directly to first responders and may be live-streamed. This scenario is discussed in greater detail below.

In some embodiments, when the event indicator 214 is selected, the user may view the video recorded from the camera 208 and any other camera that may have captured the event. In some embodiments, the user may select a time and a new location within the environment 204, and the associated map 206 is displayed from the time of the event. In this way, the user may then interact with the map 206, as described above, and view the video data from any camera at the time of the event.

In some embodiments, only a section of the map 206 that may have captured the event and is in close proximity to the location of the event is stored and accessible by the user. For example, if an event is detected on level 2, block 3, data may not be stored at level 2, block 4 if there is no indication that the event is a result of, or influences, activity in level 2 block 4. In some embodiments, only the video and sensor data associated with the event and no peripheral data is stored. Only storing data associated with the events may reduce the amount of storage necessary when the event is confined to a particular region of the GMS environment 204.

In some embodiments, the amount of data is reduced by disregarding data where no events occur. For example, if a hallway is empty for several hours, as detected by motion sensors, video data, and door sensors, the data is deleted. In some embodiments, the recorded data is on a loop. For example, the recorded data for the hallway may be stored for five minutes, thirty minutes, one hour, or any amount of time. If nothing is detected, the new, live, recording is looped after that time period to record over the old data. As such, at any time when an event has not occurred, only data for the preset time period loop may be stored. When an event occurs, the data is stored permanently for review if the event is determined to be a reviewable event as denoted by the threat level, severity, and urgency of the detected and recognized event.

In some embodiments, pre-event recording may be enabled. In some embodiments, the data stored in a loop may be triggered to store permanently if an event is detected as in a pre-event recording scenario. For example, the data from the sensors may be stored in the time frames listed above or in even shorter segments. When a triggering event occurs such as, for example, when a fire alarm is activated, the sensor data is no longer overwritten and may be stored such that it can be reviewed by the security team. In this situation, the exemplary video data including the set amount of time before the triggering event is recorded is stored for review. Accordingly, the event that triggered the fire alarm is recorded.

The triggering events may be any event that is detected by any of the sensors. For example the sensors detecting triggering events may be motion, video, infrared, biometric, chemical, proximity, and any other sensor that may detect any event that may be recorded. The events may be any activity that may be detected with the sensors. These activities may include a fire, a conflict, a person in proximity to an object, object recognition, facial recognition, detection of a proximity tag, opening of a door or window, and any other event and activity that may be detected.

Figure 3:
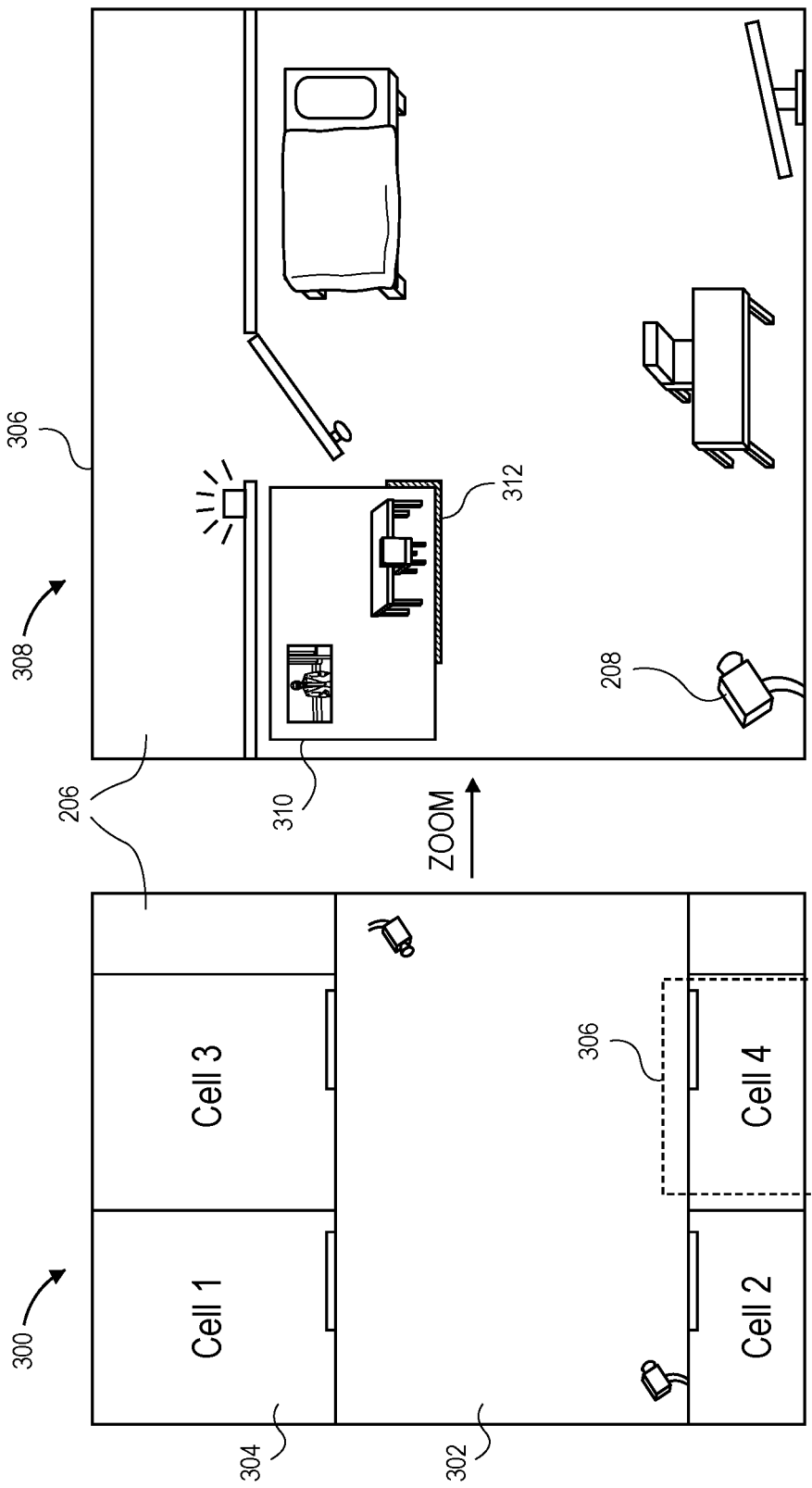
FIG. 3 depicts an embodiment of a map for monitoring the environment.

FIG. 3 depicts the interactive map 206 generating various views based on the zoom of the map 206. For example, the map 206 may display a level of a prison. In block 300, the walls of the prison may be displayed outlining a hallway 302 and each cell 304. Zooming in may generate an entirely different display. Because the image is a vector image rather than simply a bitmap image, different information may be displayed based on the zoom level. The GMS may generate a different set of information based on the zoom, or magnification. In block 308, the map 206 is zoomed in closer to show the section 306 of cell 4. The map 206 in block 308 displays a bed, a television, and a desk and chair in the cell. Further, the map 206 displays camera indicia on the inside of the cell. This level of detail may allow the user to zoom in to see various details at various locations around the prison.

In some embodiments, the camera indicia 208 is in view at various zoom levels. In some embodiments, the user may be able to view the camera indicia 208 at all levels. In some embodiments, the video from the camera automatically appears when zoomed in to a specified level. For example, the user may zoom in to the cell and a video display 310 appears, providing a live video feed of the cell. The video display 310 may present the video data recorded by the camera or a live view. The live view may automatically appear at a zoom level based on customization options provided to the user. Further, in some embodiments, the user may select a zoom level from the panel 210 that zooms into a location and automatically displays the video display 310. The automatic zoom level may be based on the video display generation in the map 206.

In some embodiments, a camera direction indicator 312 is displayed on the video display 310 presenting the video data. The camera direction indicator 312 may represent the direction the camera is facing such that the user may know the direction when the camera indicator 226 is not viewed. The user may then be able to adjust the direction by input in the GUI. In some embodiments, the camera direction indicator 312 is an outline on the side of the video display 310 that either indicates the front of the camera or the back of the camera. The camera direction indicator 312 may also indicate the zoom of the camera. For example, the camera direction indicator 312 may be narrow for wide angle and broader for a zoomed in more narrow view of the prison cell. In some embodiments, the camera direction indicator 312 may be color coded such that different colors represent different angles and zoom levels. In some embodiments, the camera zoom level and direction are numerically displayed on, or near, the camera direction indicator 312.

In some embodiments, the user may select to view a room by hovering over the room or clicking on a portion of the map 206 representing the room. The GUI may automatically zoom to the level necessary to display the video and automatically open the video display 310.

In some embodiments, the video display 310 may automatically open when a triggering event occurs. For example, a triggering event may occur at a location in the prison. The GMS may automatically display the region of the event and automatically open the video display 310 in the GUI 200. The video display may be from any camera determined to have captured the event directly or may be in close proximity and pointed in the direction of the event detected by a different sensor. Further, any information associated with sensors or any information resulting from analysis of the data from the event may be displayed in the GUI 200. For example, the information resulting from analysis of the data from the event may be the identity of individuals in the video based on proximity identity detectors, facial recognition, iris scans, or any other identifying information. The information may also be directly from the sensors such as motion detection, heat detection, and any other sensor detection. The information may also be metadata associated with the sensor such as location and time information. Further, the GUI 206 may display text, icons, or any other indicator identifying the triggering event as associated data.

In some embodiments, the user may zoom out on the map 206 to larger and larger magnifications. The user may zoom out further than the map 206 can generate an image. In this case, the map 206 may switch to satellite, aerial, or other open source imagery. In some embodiments, the GMS may be in communication with any open source maps and data that may be used to display the environment or any nearby or associated environments. For example, the map 206 may be of a school. The user may zoom out on the map 206 to view nearby hospitals and drive times to the hospital. The user may simply zoom out in the map 206, connect to, and view, open-source map data and retrieve the current road conditions and drive time to the hospital.

Figure 4:
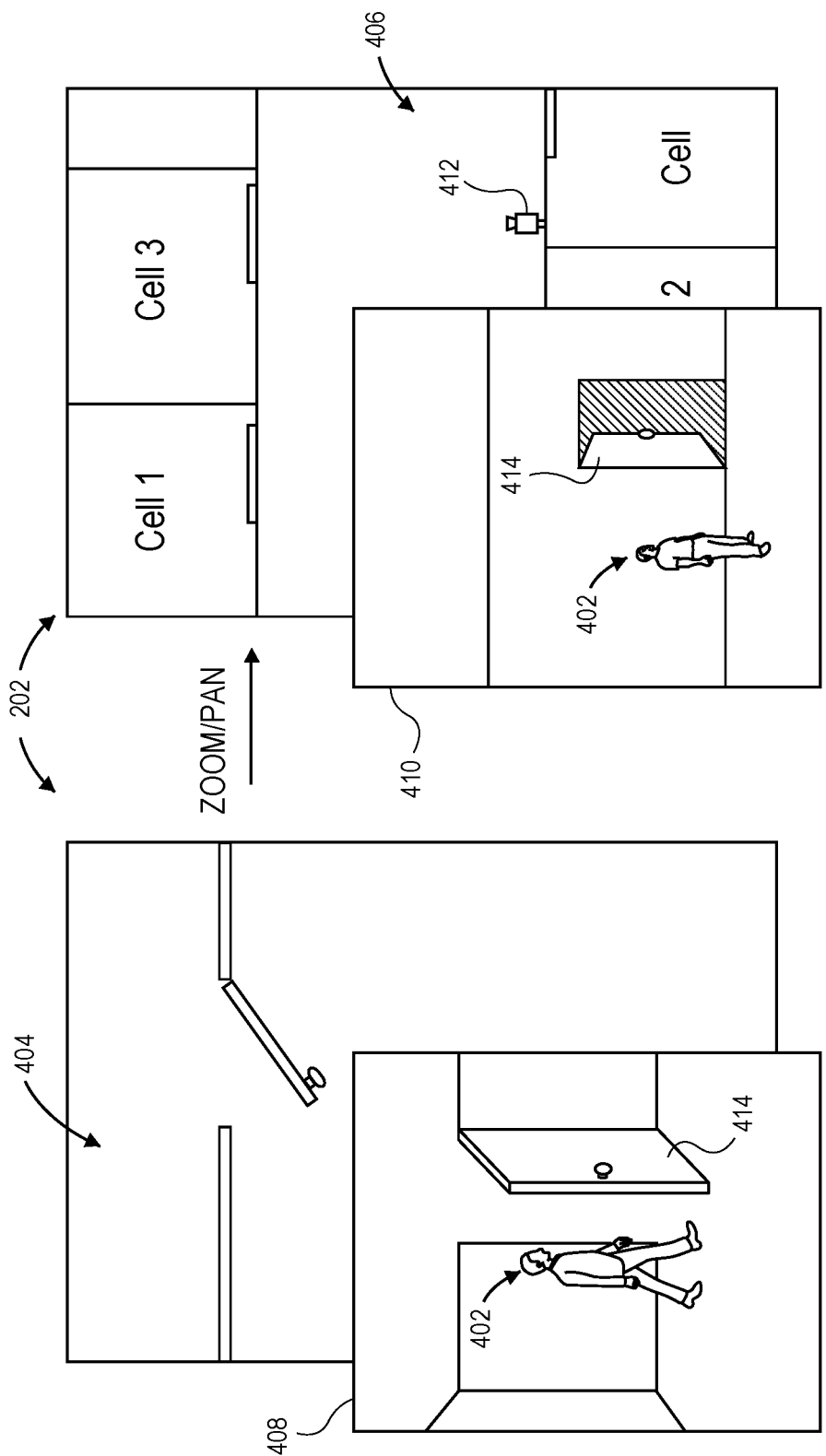
FIG. 4 depicts an embodiment of a map for monitoring the environment.

FIG. 4 depicts a series of rooms that may be in the GMS environment 204, which is an exemplary prison building. In the exemplary scenario depicted in FIG. 4, a suspect 402 is under surveillance for suspicious activity and the user of the GMS is monitoring the suspect 402 in a live feed. In some embodiments, the scenario presented here is a review of a recorded event accessed via the timeline 212. In this scenario, the suspect 402 moves from the first room 404 to the second room 406. The user may view the first room 404, which is an exemplary prison cell, via a first video display 408 associated with a first camera in the first room 404. Similarly, the user may view the second room 406, which is an exemplary hallway, via a second video display 410 associated with a second video camera in the second room 406. In some embodiments, the user may view both rooms and display both videos via a single video display. In some embodiments, both zoom levels in both rooms may be presented simultaneously via the GUI 200.

In some embodiments, the user may visually follow the suspect 402 throughout the GMS environment 204 by selecting video camera indicia associated with the video cameras for displaying the video. For example, the user may be viewing the suspect in the first video display 408. When the suspect moves into the second room 406 the user may select the video camera indicia 412 and the second video display 410 may appear or, in some embodiments, the first video display 408 may change to display the second video from the hallway. In some embodiments, as depicted, multiple video displays may be viewed simultaneously.

In some embodiments, the user may simply zoom or pan the map 206 to center the second room 406. The act of centering the second room 406 at a prescribed zoom level may initiate display of the camera data on at least one of the first video display 408 and the second video display 410.

In some embodiments, the user may not need to manually change the video camera views as the GMS may automatically follow the suspect 402. The user may designate the suspect 402 by clicking on the suspect 402 in the first video display 402 and the GMS may then display video of the suspect 402 from different cameras and different rooms and follow the movement of the suspect 402 automatically. The GMS may utilize object recognition or movement recognition to follow the suspect 402. For example, the suspect 402 may move from the first room 404 to the second room 406 and the GMS may recognize that the suspect has left the first room 402. Further, the GMS is connected to all sensors such that the GMS may also recognize that the door 414 was opened then movement was detected outside of the door 414. This may indicate that the suspect 402 has moved into the second room 406. The GMS may switch the video feed to receive and display data from the video camera 412, thus, showing the second video display 410. In some embodiments, the GMS may also switch the map 206 to display the second room 406 which, in this exemplary scenario, is the hallway outside of the first room 404. In some embodiments, the user may switch the map 206 by zooming and panning the map 206. The camera feeds may be switched by the process of panning and zooming performed by the user interacting with the map 206.

In some embodiments, the GMS may recognize the suspect 402 automatically and track the suspect 402. For example, the suspect 402 may be in an altercation. The GMS may recognize the altercation by comparing the movements to a stored database of altercations. Further, the suspect 402 may be in an unauthorized location. This may trigger the GMS to automatically track the movement of the suspect 402 throughout the environment. The suspect 402 may move from the first room 404 into the second room 406 as described above. Upon entering the second room 406, the video feed from the first video camera may switch automatically to the second video camera 412. The GMS may recognize that the suspect has entered into the second room 406 by tracking the suspect 402 movement through the video cameras, door sensors, motion detectors, and any other sensors that may detect the movements of suspect 402. The above embodiments may be performed during live feed and in stored history mode.

Figure 5:
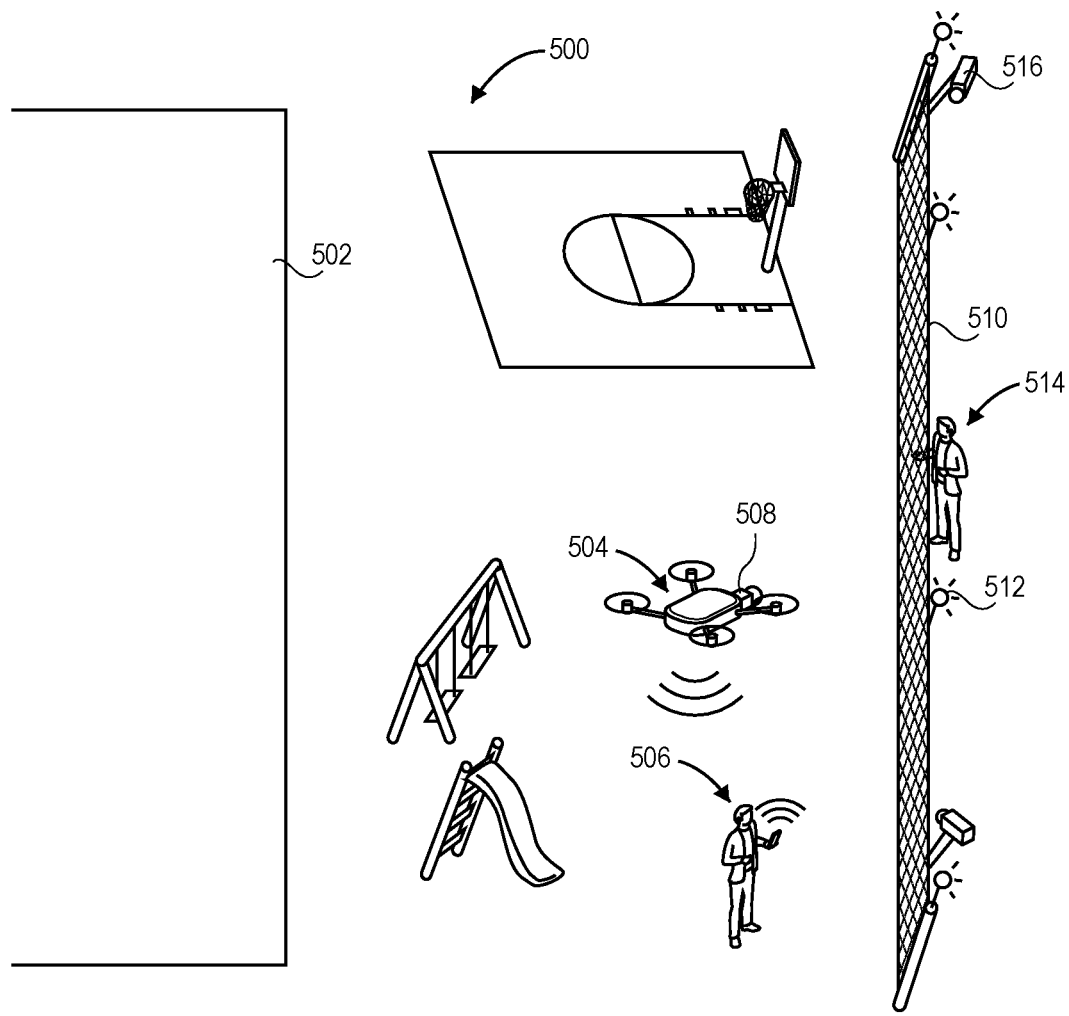
FIG. 5 depicts an exemplary schoolyard environment for implementing embodiments of the graphical monitoring system.

In some embodiments, the GMS may be connected to remote-controlled or autonomous aerial vehicles generally referenced herein as drones. FIG. 5 depicts an exemplary outer area 500 of a school building 502 that may be displayed on the map 206 of the GUI 200 by the GMS. The drone 504 may be controlled by a pilot 506. The pilot 506 may use a standard controller and be positioned in an area to view the drone 504 and the area surveilled. In some embodiments, the pilot 506 is the user of the GMS as described in embodiments herein and is in a remote location. The drone 504 may comprise at least one drone camera 508 and transceiver to transmit and receive information. The drone camera 508 may relay video data to the GMS for viewing by the user at a display at a remote location. In some embodiments, the video from the drone 504 may be accessed by the video display 310 as described in embodiments above. For example, the map 206 may present one or more drone indicia that the user may select. A drone video display (e.g., exemplary video display 310) may be displayed showing the video data from the drone 504. In some embodiments, the user may zoom into the map 206 at the position of the drone 504 and the video from the drone camera 508 is displayed when the zoom reaches a prescribed level.

In some embodiments, the user at the GUI 200 of the GMS may control the drone 504. The user may input coordinates, waypoints, or any other input to control the drone 504 to fly to a location or along a route. In some embodiments, the user of the GMS may take control of the drone 504 at the GUI using a joystick or keypad and fly the drone 504 in real time. The user may fly the drone 504 using tracking in the map 206 or other map system displaying the location of the drone 504. In some embodiments, the user may fly the drone 504 tracking the drone movement through a live-feed from the drone camera 508 displayed in the GUI 200 in the drone video display.

In some embodiments, the drone 504 may be autonomous and fly in a prescribed pattern. The drone 504 may comprise sensors such as, for example, accelerometers, gyroscopes, GPS, temperature, pressure, wind, and any other sensors that may be useful in controlling the drone 504. The drone 504 may transmit any sensor information to the GMS for tracking and control. In some embodiments, the map 206 may update periodically with the location of the drone 504. The drone indicia may move around the map 206 based on the location of the drone transmitted to the GMS from the drone 504. The user at the GMS GUI 200 may track and control the drone 504 based on the sensor information received, including the video data.

Continuing with the exemplary embodiment described in reference to FIG. 5, the GMS may comprise a perimeter detection for detection of events along a fence 510 of the school yard, or in some embodiments, a prison. The fence 510 may include sensors 512 such as, for example, video cameras, motion sensors, strain gages, pressure sensors, and any other type sensor that can detect a person 514 in close proximity and attempting to breach or scale the fence 510. When a sensor is triggered, an alert may be sent to the user of the GMS. In some embodiments, a video of the fence video camera 516 is automatically displayed at the GUI 200 in the video display 310. The user may select the fence 510 at the drop-down menu 210 or by simply zooming out until the outside of the school building 502 is in view. The user may also zoom in to different locations around the outside of the building 502 such as, for example, the fence 510. Upon zooming in to a prescribed zoom level, the video from the fence video camera 516 may be displayed.

In some embodiments, the GMS may be installed in a house, university, sports stadium, mall, school, business, or any other location that may utilize security and monitoring via any type of sensors. For example, the GMS may be installed in a smart home. The GMS may be connected to all sensors in a house as described in the above embodiments. When an event is detected by a sensor, an alert may be sent to a homeowner via a monitor and a smart device such as a tablet and a smart phone. The map 206 may feature the house on the GUI 200 provided on a tablet or smart phone of the user. Further, an alert may be sent to a monitoring agency that may also have access to the GMS. The events may be any event that may be detected by the sensors such as, for example, a fire alarm, a motion detector, a magnetic door detector, and any other home security sensor.

In an alternative embodiment, the prison building described above may be a school. The school may include the GMS and associated sensors as described above. In some embodiments, the GMS may comprise a communication system for communicating with a third-party such as a local 911 dispatch and first responders. In some embodiments, triggering events may be, for example, a smoke detector detects smoke, a motion sensor detects a person trying to break into the school, an object recognition system detects a weapon, an audible recognition system detects discharge of a firearm, and any other such events. The GMS may automatically alert first responders and live-stream the video cameras to the first responders. For example, a person with a firearm attempts to enter a school. The firearm is captured on video and object recognition software in the GMS determines that the object is a firearm and determines that the person is a threat. The GMS automatically live-streams the video along with location information of the camera to the first responders across a secure network. In some embodiments, the secure network is the first responder network, or a third-party network, and the location information is stored as metadata with the video data.

In another exemplary alternative embodiment, the building may be a sports arena. The sports arena security system may be the GMS and include all sensors and functions as describe above. The GMS may relay video of incidents and suspects to mobile devices of security officers to quickly find suspects. For example, an altercation may break out in the stands of a football game. The video cameras may be pointed in the direction of the altercation and capture the perpetrators. A still image of the perpetrators may be captured and sent automatically to the security team mobile devices along with location information such that the security team may close in and find the perpetrators quickly.

Figure 6:
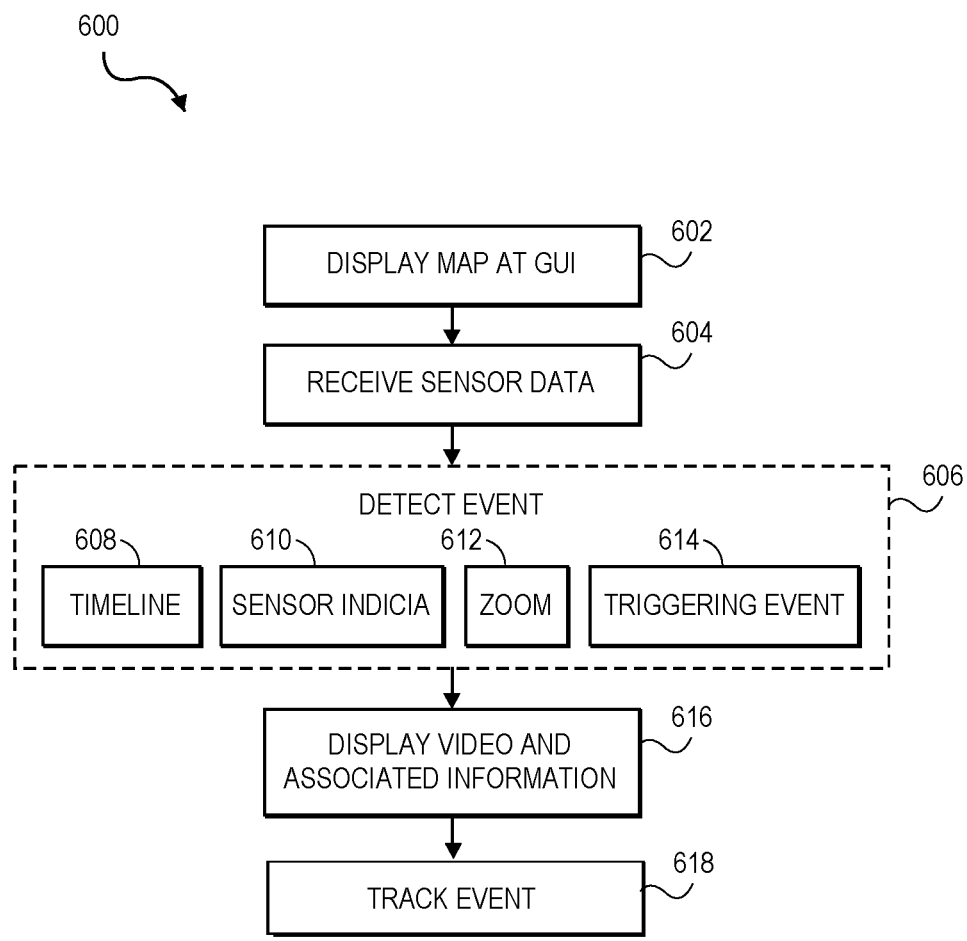
FIG. 6 depicts an exemplary process of monitoring an environment using the graphical monitoring system.

FIG. 6 depicts an exemplary method of monitoring activity via the GMS generally referenced by the numeral 600. At step 602, the GUI 200 is displayed to the user by the GMS on a desktop, laptop, tablet, mobile device, or any other computing device as described in embodiments above. The map 206 may be presented to the user representing the environment 204. The map 206 may be a vector graphics image that generates the map information when the user interacts with the map 206. The user may manipulate the map 206 on the GUI 200 by panning, zooming, selecting icons, cutting and pasting, and moving panels and windows. Further, the structure of the GUI 200 may be customizable by the user.

At step 604, the GMS receives and may display sensor data as described in embodiments above. Any data associated with any sensors including video cameras may be received by the GMS and displayed on the map 206 at any location including the locations associated with the sensors. The sensors may be motion sensors, magnetic sensors, biometric sensors, chemical sensors, light sensors, proximity sensors, as well as microphones, cameras, video cameras, and any other sensors that may be useful for monitoring activity in an environment.

At step 606, a detected event may prompt video display and sensor data access. The video display may occur as a result of various actions including selection of the timeline, selection of sensor indicia, zoom, and detection of a triggering event.

At step 608, the timeline 224 may be accessed to display video and sensor data of a particular time and place that an event occurred as described in embodiments above. The user may select an event indicator 214 that may provide indications of the urgency or severity of the event. The user may then view sensor data such as video data associated with the event. Upon selection of the event on the timeline 224 the map 206 and all data may be initialized to the location and the time of the event such that the user may be presented with the environment 204 during the event. The user may then move through the stored data to witness the actions in the environment 204 at the time of the event.

At step 610, the sensor indicia may be selected to show sensor data as described in embodiments above. Any sensor associated with the GMS may include associated indicia displayed on the map 206. The indicia may be viewed at any zoom or be displayed at particular close-in zoom levels. The user may select or hover over the indicia to view the sensor data, including video data.

At step 612, the sensor data may be viewed simply by zooming or panning the map 206 as described in embodiments above. The user may zoom in on a room in the map 206 and sensor data for the room may automatically be viewed via a sensor display. The zoom level for viewing various information and detail about the map 206 may be customizable by the user. Different zoom levels may display different details including sensor information.

At step 614, the sensor data may be displayed automatically when a triggering event occurs as described in embodiments above. The triggering events may be a detection of any event by the sensors that may present a possibility of a threat such as, for example, a fire, an altercation, an unauthorized person, an unauthorized object, or any other detection that may present a threat. The severity or urgency of the event may be determined in a threat-level scale and the actions taken by the GMS, such as display of the event and storage of the event, may be determined by the threat level of the event.

At step 616, the GMS and user may track the event as described in embodiments above. The user may move the map 206 to follow the suspect 402 that appears on the video displays. The GMS may automatically change the display to new camera views of the suspect 402 as the user pans around the map. Further, the GMS may automatically follow the suspect as indicated by the user as described in embodiments above.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method of monitoring an environment by a user interface using a graphical management system, the method comprising:
   presenting, to a user and via the user interface, a map of the environment at a first zoom level,
   wherein the map of the environment is a vector graphics image;
   receiving, from the user, an input indicative of a change in a zoom level of the map from the first zoom level to a second zoom level;
   updating the map of the environment to display at the second zoom level,
   wherein the second zoom level is narrower than the first zoom level;
   displaying a video pane in the user interface;
   obtaining video data of the environment,
   wherein the video data comprises one of live video data or recorded video data;
   displaying, in the video pane, the video data of the environment;
   receiving, from the user, a further input indicative of a further change in the zoom level of the map from the second zoom level to a third zoom level;
   updating the map of the environment to display at the third zoom level; and
   responsive to detecting that the third zoom level is wider than a specified zoom level, presenting, via the user interface, open-source map data in place of the vector graphics image.

2. The method of claim 1, further comprising:
   displaying a video camera icon in the map of the environment at a map location corresponding to a camera location of a video camera in the environment; and
   displaying the video camera icon based on the zoom level of the map.

3. The method of claim 1,
   wherein the live video data is obtained from a source selected from a group consisting of a video camera disposed within the environment or the graphical management system, and
   wherein the recorded video data is stored by the source.

4. The method of claim 1, wherein the specified zoom level is a first specified zoom level; and further comprising:
   responsive to detecting that the second zoom level is narrower than a second specified zoom level,
   wherein the second specified zoom level is narrower than the first specified zoom level:
      overlaying sensor data from at least one sensor on the map of the environment at a location corresponding to the location of the at least one sensor in the environment,
      wherein the at least one sensor is a motion detector, a biometric sensor, a smoke detector, a magnetic detector, or a proximity detector.

5. The method of claim 1, further comprising displaying the video pane over an area of the map of the environment corresponding to the environment for which the video data is being displayed.

6. The method of claim 1,
   wherein the input is indicative of zooming in on a feature moving through the environment; and
   further comprising updating the video data displayed in the video pane to track the feature as it moves through the environment.

7. A method of monitoring an environment with a graphical management system via a user interface, the method comprising:
   presenting, to a user and via the user interface, a map of the environment at a first zoom level,
   wherein the map of the environment is a vector graphics image;
   displaying a plurality of video camera icons in the map of the environment at a plurality of map locations corresponding to a plurality of locations of a plurality of video cameras in the environment;
   receiving, from the user, an input indicative of a change in a zoom level of the map from the first zoom level to a second zoom level;
   updating the map of the environment to display at the second zoom level;
   displaying a plurality of video panes in the user interface;
   obtaining video data of the environment,
   wherein the video data comprises one of live video data or recorded video data;
   receiving, from the user, a further input indicative of a further change in the zoom level of the map from the second zoom level to a third zoom level;
   updating the map of the environment to display at the third zoom level; and
   responsive to detecting that the third zoom level is wider than a specified zoom level, presenting, via the user interface, open-source map data in place of the vector graphics image.

8. The method of claim 7, further comprising selectively displaying the plurality of video camera icons based on the zoom level of the map.

9. The method of claim 7, wherein each video pane of the plurality of video panes is displayed in the map of the environment at a map location corresponding to a location of a corresponding active camera in the environment.

10. The method of claim 7,
wherein the specified zoom level is a first specified zoom level; and
further comprising, responsive to detecting that the second zoom level is narrower than a second specified zoom level, wherein the second specified zoom level is narrower than the first specified zoom level:
overlaying sensor data from at least one sensor on the map of the environment at a location corresponding to the location of the at least one sensor in the environment,
wherein the at least one sensor is a motion detector, a biometric sensor, a smoke detector, a magnetic detector, or a proximity detector.

11. The method of claim 7,
wherein the live video data is obtained from one of a plurality of active video cameras of the plurality of video cameras or the graphical management system, and
wherein the recorded video data is stored by one of the plurality of video cameras disposed within the environment or at the graphical management system.

12. The method of claim 7, wherein the input is indicative of zooming in on a feature moving through the environment; and
further comprising updating the video data displayed in the plurality of video panes to track the feature as it moves through the environment.

13. A system for monitoring an environment with a graphical management system comprising:
a video camera capturing video data of the environment;
a display;
a processor; and
one or more non-transitory computer-readable media storing computer-executable instructions that, when executed by the processor, perform a method of displaying a user interface of a map of the environment including the video data, the method comprising:
displaying, on the display and in the user interface, the map of the environment at a first zoom level,
wherein the map of the environment is a vector graphics image;
receiving, from a user, an input indicative of a change in a zoom level of the map from the first zoom level to a second zoom level;
updating the map of the environment to display at the second zoom level;
displaying a video pane in the user interface;
obtaining the video data of the environment,
wherein the video data comprises one of live video data or recorded video data;
displaying, in the video pane, the video data of the environment;
receiving, from the user, a further input indicative of a further change in the zoom level of the map from the second zoom level to a third zoom level;
updating the map of the environment to display at the third zoom level; and
responsive to detecting that the third zoom level is wider than a specified zoom level presenting, via the user interface, open-source map data in place of the vector graphics image.

14. The system of claim 13, wherein the method further comprises displaying a video camera icon in the map of the environment at a map location corresponding to a camera location of the video camera in the environment,
wherein the video camera icon is displayed selectively based on the zoom level of the map.

15. The system of claim 13,
wherein the live video data is obtained from a source selected from a group consisting of the video camera or the graphical management system, and
wherein the recorded video data is stored by the source.

16. The system of claim 13, wherein the method further comprises displaying the video pane over an area of the map of the environment corresponding to the environment for which the video data is being displayed.

17. The system of claim 13, further comprising an additional video camera, and wherein the method further comprises:
displaying an additional video pane in the user interface;
obtaining additional video data of the environment from the additional video camera; and
displaying, in the additional video pane, the additional video data of the environment.

18. The system of claim 13, further comprising at least one sensor,
wherein the at least one sensor is a motion detector, a biometric sensor, a smoke detector, a magnetic detector, or a proximity detector.

19. The system of claim 18,
wherein the specified zoom level is a first specified zoom level; and
wherein the method further comprises, responsive to detecting that the second zoom level is narrower than a second specified zoom level, wherein the second specified zoom level is narrower than the first specified zoom level, overlaying sensor data from the at least one sensor on the map of the environment at a location corresponding to the location of the at least one sensor in the environment.

20. The method of claim 7, further comprising:
if the video data comprises the live video data:
for each video pane of the plurality of video panes, displaying, in each video pane, the live video data of the environment; and
if the video data comprises the recorded video data:
receiving a selection of a time from the user; and
for each video pane of the plurality of video panes, displaying, in each video pane, the recorded video data of the environment from a corresponding camera of the plurality of video cameras.

* * * * *